United States Patent
Jurica et al.

(10) Patent No.: US 6,997,568 B2
(45) Date of Patent: Feb. 14, 2006

(54) APPARATUS FOR MEASUREMENT WATER DEPTH INCLUDING A PIEZOELECTRIC SCANNING ASSEMBLY

(75) Inventors: Svatopluk Leopold Jurica, Clovelly Park (AU); Michael Frederick Penny, Salisbury Heights (AU)

(73) Assignee: Tenix Lads Corporation PTY LTD, (AU)

( * ) Notice: Subject to any disclaimer, the term of this patent is extended or adjusted under 35 U.S.C. 154(b) by 63 days.

(21) Appl. No.: 10/483,649

(22) PCT Filed: Jan. 20, 2003

(86) PCT No.: PCT/AU03/00047

§ 371 (c)(1),
(2), (4) Date: Jan. 13, 2004

(87) PCT Pub. No.: WO03/065068

PCT Pub. Date: Aug. 7, 2003

(65) Prior Publication Data

US 2004/0169943 A1    Sep. 2, 2004

(30) Foreign Application Priority Data

Feb. 1, 2002    (AU) ...................................... PS0221

(51) Int. Cl.
*G02B 7/182*    (2006.01)

(52) U.S. Cl. ..................... 359/876; 359/198; 356/4.01

(58) Field of Classification Search ................ 359/872, 359/873, 874, 876, 877, 198; 356/4.01
See application file for complete search history.

(56) References Cited

U.S. PATENT DOCUMENTS

| 4,518,254 | A |   | 5/1985 | Penny et al. |
| 4,576,449 | A |   | 3/1986 | Ruger |
| 5,642,237 | A | * | 6/1997 | Miyawaki et al. ........... 359/849 |
| 6,049,407 | A |   | 4/2000 | Melville |
| 6,069,420 | A | * | 5/2000 | Mizzi et al. ........... 310/40 MM |

FOREIGN PATENT DOCUMENTS

| SU | 964-512 A | 4/1980 |
| SU | 2071581 C1 | 8/1992 |
| WO | WO 02/42792 A1 | 11/2001 |

* cited by examiner

*Primary Examiner*—Mark A. Robinson
*Assistant Examiner*—Alessandro Amari
(74) *Attorney, Agent, or Firm*—Sand & Sebolt

(57) ABSTRACT

A Laser Airborne Depth Sounder (LADS) system for the measurement of water depth is disclosed, the system includes a transmitter and a receiver of laser light having at least two wavelengths so as to receive a first reflection from a water surface and a second reflection from a water bottom, and a mirror (32) adapted to reflect the second reflection laser light and rotate around a major axis (34) and minor axis (36) where the rotation of the mirror (32) around the minor axis (36) is provided by a piezo electric actuator (68). The piezo electric actuator (68) drives the mirror (32) around the minor axis (36) through a mechanical level (72).

14 Claims, 6 Drawing Sheets

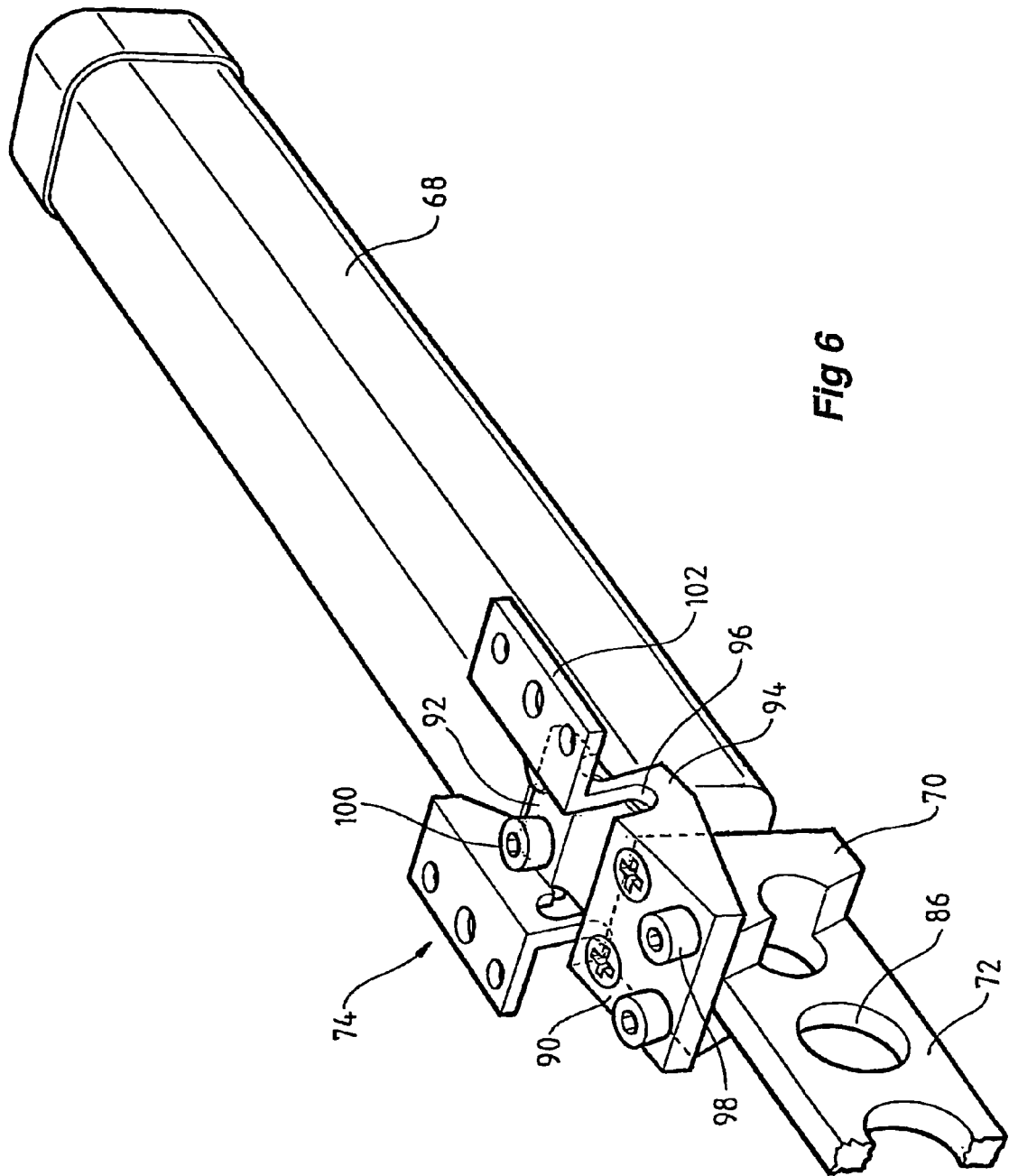

APPARATUS FOR MEASUREMENT WATER DEPTH INCLUDING A PIEZOELECTRIC SCANNING ASSEMBLY

The present invention relates to an improved apparatus and method for the measurement of water depth using a scanning mirror where the scanning mirror is driven rotationally in one axis by the use of a piezo electric actuator.

BACKGROUND OF THE INVENTION

Laser Airborne Depth Sounder (LADS) systems are used to measure water depth, i.e. the distance between a water surface and the bottom located beneath the surface. This depth measuring capability may be extended to also measure the height of land, and it is understood that the following descriptions that refer to the measurement of water depth can also encompass land height measurement.

The LADS systems contain measuring equipment that is mounted within an aircraft. Typically a fixed wing aircraft is used. During flight, the equipment measures over a vast area the depth at "sounding" positions. These sounding positions are typically in the form of a rectilinear grid pattern that has a 5 m×5 m grid spacing. Typical depth of water that can be measured by the systems is up to 70 m. The position of each sounding is determined with a Global Positioning System (GPS) and recorded with the associated measured depth. This "sounding" data is stored on appropriate media for later evaluation, e.g. digital tape.

The measuring equipment includes a laser that is pointed in a direction downward from the aircraft towards the water. The laser light is pulsed and directed to a sounding position by a primary mirror. Oscillating this mirror about two axes whilst the aircraft is flying creates the grid pattern of sounding on water. The spacing between the soundings also depends on the aircraft altitude, the aircraft forward speed, the frequency, and amplitude of oscillation of the primary mirror and the pulse rate of the laser. Due to design constraints of the LADS system, the primary mirror has a relatively large moment of inertia, which limits the rate at which the primary mirror can be oscillated. This limits the minimum spacing that can be achieved between laser soundings.

In co-pending applications, whose contents are incorporated by reference therein, and entitled "An apparatus and method for oscillating a transmitted laser beam of light within the Field of View (FOV) of a light receiving system" and "An apparatus and method for the measurement of water depth using a controlled receiver" the applicant disclosed an improvement in the scanning resolution of the system by using an additional or secondary mirror that dithers the green laser pulse prior to it being transmitted, and an improvement in the steering of the receiver beam by using a controllable shutter within the receiver for the green laser pulse.

A characteristic of both those systems is that the primary mirror needs to be rotated around two axes with a quick response time. The primary mirror is relatively heavy and in older systems it has been difficult to provide a continuous rotational motion without failure or unnecessary complexity.

It is an object of the present invention to improve or at least provide the public with a useful alternative by providing a novel way of oscillating the mirror about at least one of its axes.

SUMMARY OF THE INVENTION

Therefore in one form of the invention there is proposed a mirror assembly adapted for rotation around an axis including:
a mirror;
a piezo electric actuator;
a longitudinal lever flexibly attached at one end to said actuator and mechanically coupled at the other end to the mirror at a location distal to said axis of rotation;
said mirror pivotably attached to said actuator along said axis of rotation wherein operation of said actuator causes it to extend, extending and rotating said lever causing said mirror to pivot around its axis of rotation from a rest position.

Preferably said lever is connected to said actuator through a flexible hinge. That hinge may be formed of two pads connected by a bridge having a deep cutout.

Preferably the mirror is mounted to said actuator through a frame.

In preference the lever other end is mechanically coupled to said mirror through an adjusting means enabling the angular position of the mirror at rest to be adjusted with respect to the lever. The adjusting means may simply include a threaded screw that adjusts the distance between the lever and the mirror.

Preferably the mirror is attached to said frame through a biasing means adapted to bias the mirror to its rest position.

In preference the biasing means is located at a position in-line with the direction between the adjusting means and the axis of rotation.

In preference the biasing means is located at a distance from the axis of rotation further than the distance between the axis of rotation and the adjusting means.

Preferably the biasing means is a spring.

Preferably the mirror assembly is adapted to rotate in another axis of rotation.

In a further form of the invention there is proposed an apparatus for the measurement of water depth said apparatus adapted to be mounted on a flying platform and including:
a transmitter and a receiver of laser light and having at least two wavelengths so as to receive a first reflection from the water surface and a second reflection from the bottom of said water surface; and
a mirror adapted to reflect said second reflection and rotate around a major and a minor axis, wherein the rotational motion of said mirror around said minor axis is provided by a piezo electric actuator.

Preferably the piezo electric actuator drives said mirror around the minor axis through a mechanical lever. The lever may preferably amplify the movement by up to 10 times.

Preferably the mechanical lever amplifies the movement of the piezo electric actuator.

In preference the biasing means biases said mirror in a direction opposite the movement of the piezo electric actuator.

In preference the piezo electric actuator is of a longitudinal configuration and extends generally parallel to the major axis of the mirror.

BRIEF DESCRIPTION OF THE DRAWINGS

The accompanying drawings, which are incorporated in and constitute a part of this specification, illustrate several implementations of the invention and, together with the description, serve to explain the advantages and principles of the invention.

In the drawings,

FIG. 6 is a detailed perspective view of the piezo-electric actuator.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Typically mounted in an aircraft system 10 fires two laser beams, an infrared laser beam, and a green laser beam. The infrared laser beam is directed vertically downward from the system mounted in the aircraft. An infrared receiver inside the aircraft collects the light that is reflected from the surface of the water. For all transmitted pulses the aircraft height above the mean sea surface level is measured from the time taken for the infrared light to travel from the aircraft to the water surface and back to the aircraft.

The green beam is generally reflected from both the water surface and the bottom of the water floor dependant on sea surface state and water depth with the reflected light collected by a green receiver inside the aircraft. The depth of the water is calculated from the time difference between paths that the green laser beam travels to/from the surface and the bottom.

The typical survey using the LADS system generally creates a sounding pattern that is 240 meters wide with soundings on a 5 m×5 m grid, when the aircraft is flying at 175 knots at 1600 feet height. The LADS system can vary the amplitude and frequency of oscillation of the primary mirror (discussed below) to suit other sounding patterns.

During a survey, the primary oscillating mirror directs the outgoing and incoming green laser beam typically 20 degrees either side of vertical, in the transverse direction to the flight path. The mirror also directs the green laser beam parallel to the flight path to compensate for the forward speed of the aircraft.

Figure 1:
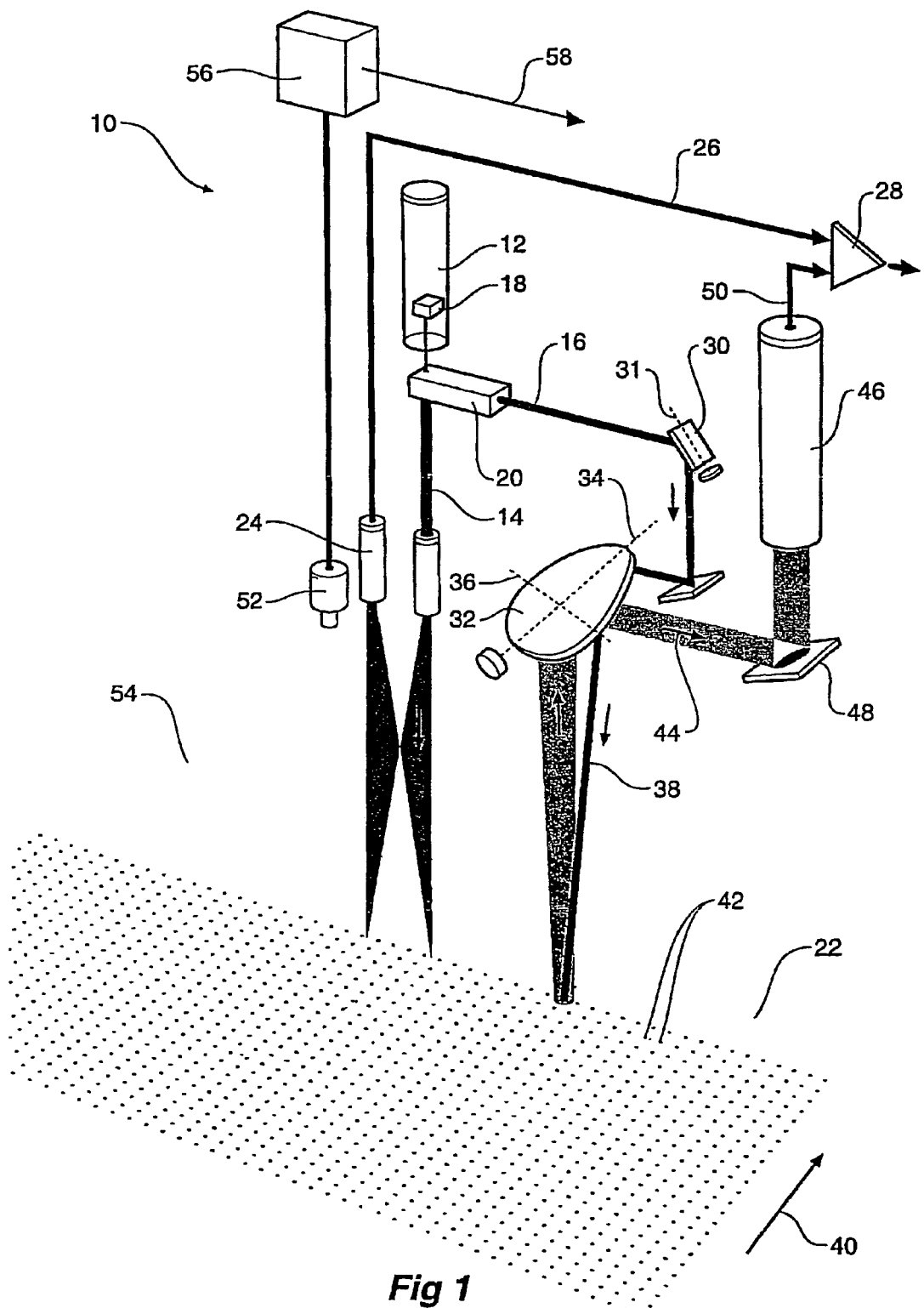
FIG. 1 is a schematic illustration of the LADS system.

The typical components of the system are illustrated in FIG. 1. The system 10 includes a laser 12 such as a Nd:YAG laser that produces an infrared laser beam 14 and a green beam 16, the latter produced using a frequency doubler 18 and passing though an optical coupler 20. The infrared laser beam 14 is reflected from the ocean surface 22 and is received by an infrared receiver 24. An infrared return signal 26 is then passed to a digitiser 28 for analysis.

The green laser beam 16 is directed to a secondary mirror (also called the delta or dithering mirror) 30, which oscillates around one axis 31 and directs the green laser beam 16 across the surface of the primary or scanning mirror 32. The primary mirror typically rotates around two axes, the major and the minor axis 34 and 36 respectively and is of elongate pear shaped construction so that it facilitates both transmission and reception of the optical energy 38.

Those skilled in the art will however appreciate that the secondary mirror 30 is but a preferred feature that increases the scanning resolution and that the system 10 can operate quite successfully without the secondary mirror 30.

Oscillation about the major axis 34 of the primary mirror 32 is used to direct the scan of the green laser beam 16 transverse to the aircraft direction 40. Oscillation about the primary mirror minor axis 36 is used to compensate for the forward movement of the aircraft. If the forward motion of the aircraft were not compensated for, then the laser scan 42 produced would be a non-rectilinear pattern in a plane parallel to the platform roll direction rather than the rectilinear scan pattern.

The green laser light 44 is reflected both from the sea surface and the sea bottom and is re-directed by the primary mirror 32 to a green receiver 46 using other optical components such as mirror 48. The green receiver 46 includes a photo multiplier (mounted within the green receiver) that converts the received light to a signal 50 to be then used to calculate the water surface depth.

To assist the operator of the scanning assembly a video camera 52 observes the sea surface 54 and provides that to the operator through video equipment 56 to an operator console 58

Figure 2:
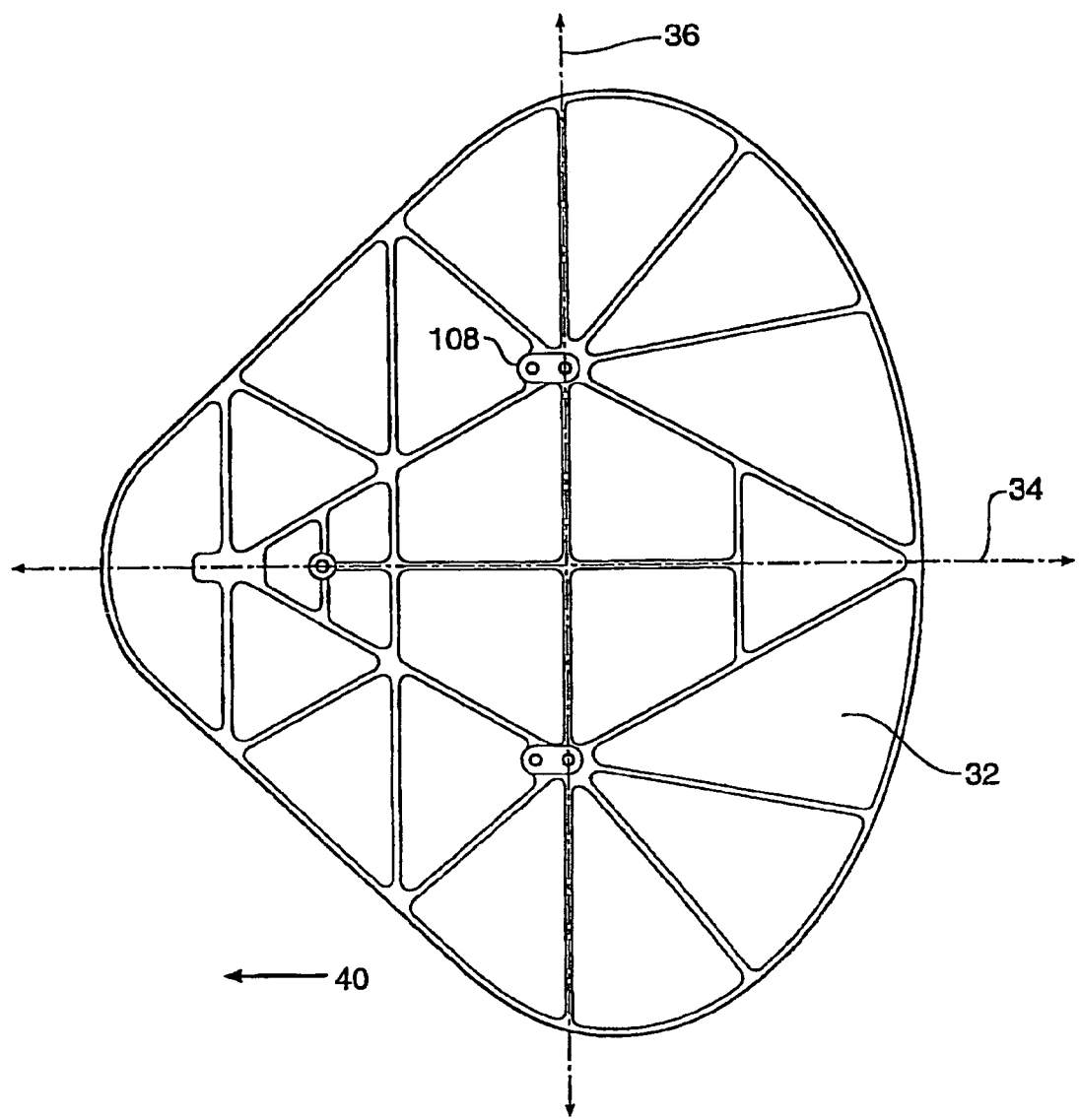
FIG. 2 is a schematic representation of the underside of a primary mirror and its axis of rotation.

Rotation about the major axis 34 of the scanning mirror 32 produces a transverse scan that swings the outgoing beam and incoming reflections a maximum of 20 degrees either side of vertical. The forward scan, or rotation about the minor axis 36, swings the outgoing beam and incoming reflections a maximum of 0.5 degrees either side of vertical, typically at a rate of 18 Hz. The mirror 32 is a relatively large mirror to provide the necessary large field of view thereby limiting the oscillating rate about the major axis 34. A schematic illustration of the primary mirror 32 is illustrated in FIG. 2.

As mentioned above, to produce a rectilinear or symmetrical scan pattern the system must compensate for the forward movement of the airborne platform by oscillating the scanner mirror 32 about the minor scan axis 36, typically rotating slowly in one direction and snapping back quickly in the other.

In existing gimballed systems one of the problems is that the gimballed drives add extra inertia in at least one axis and this makes it further difficult to drive the mirror at high speed.

Accordingly the present invention seeks to overcome existing problems by oscillating the scanner mirror 32 using a stack of piezo crystals coupled to a mechanical lever. When a DC excitation voltage is applied to the piezo crystal elements, the stack length increases linearly with the applied voltage. The mechanical lever to produce the required mirror movement then amplifies this extension. The piezo extension may be quite minor, of the order of a hundred or so micrometers.

Figure 3:
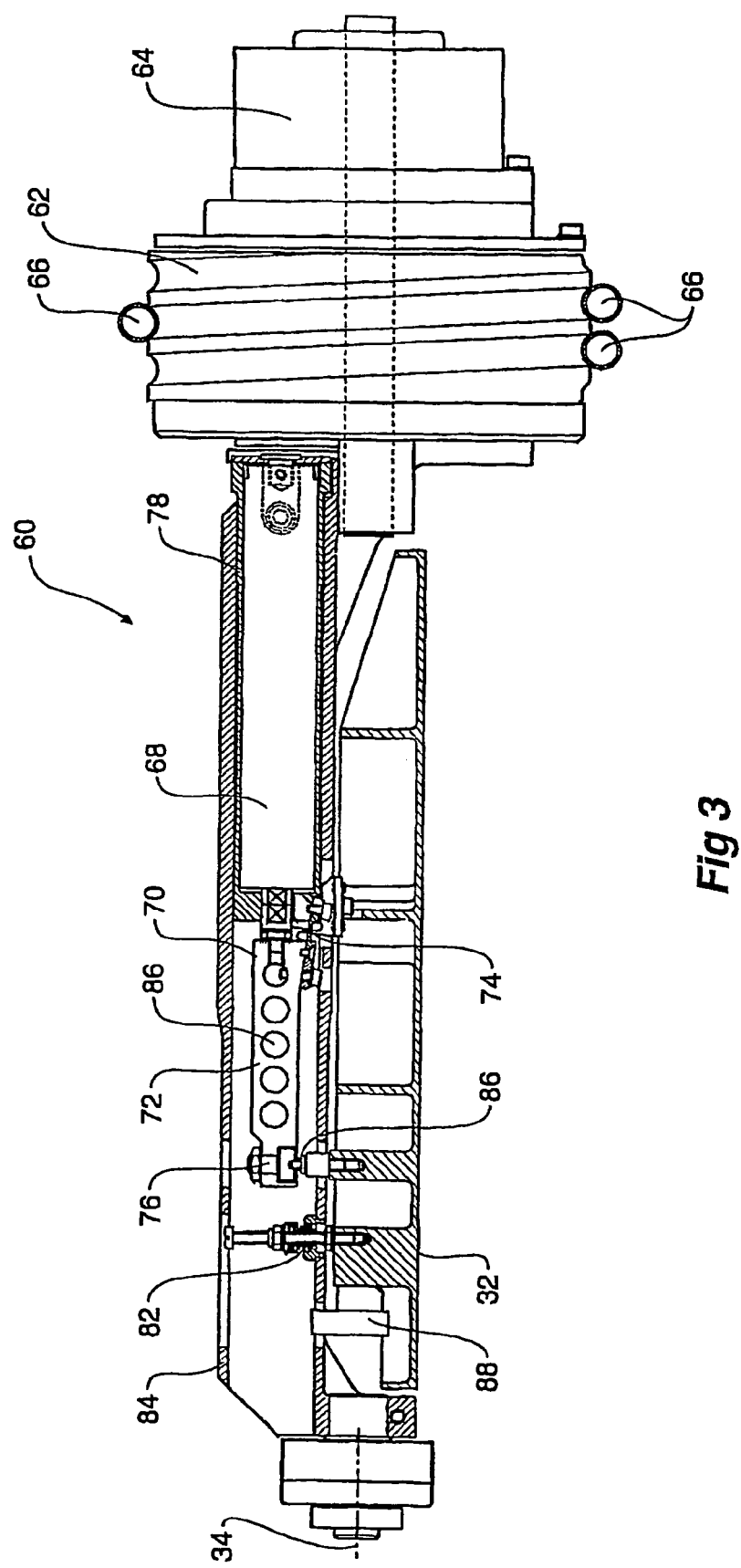
FIG. 3 is a detailed cross-sectional view of the scanner mirror assembly embodying the present invention.
Figure 4:
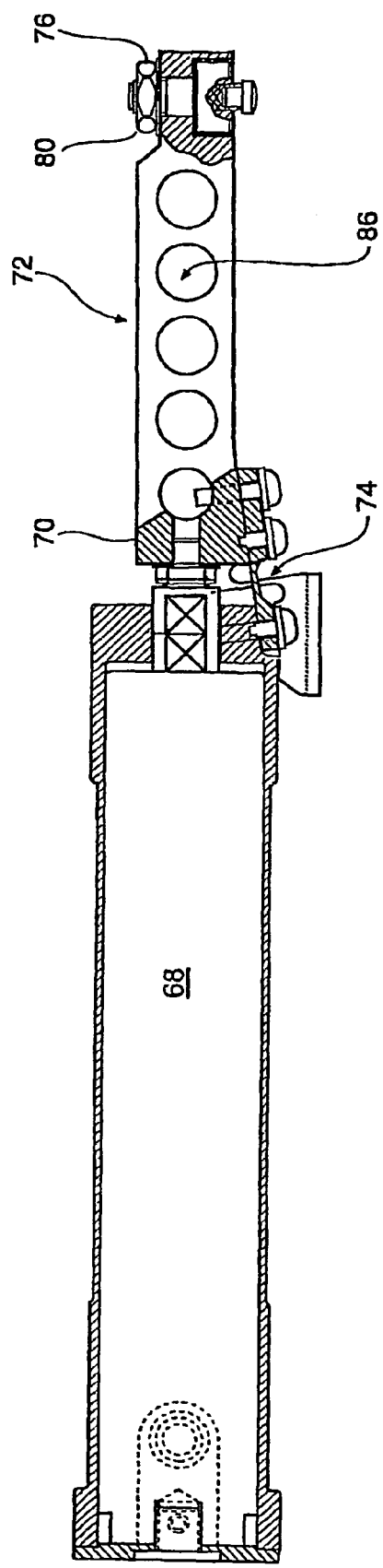
FIG. 4 is a detailed cross-sectional view of the piezo electric actuator used in the rotation of the primary mirror.
Figure 5:
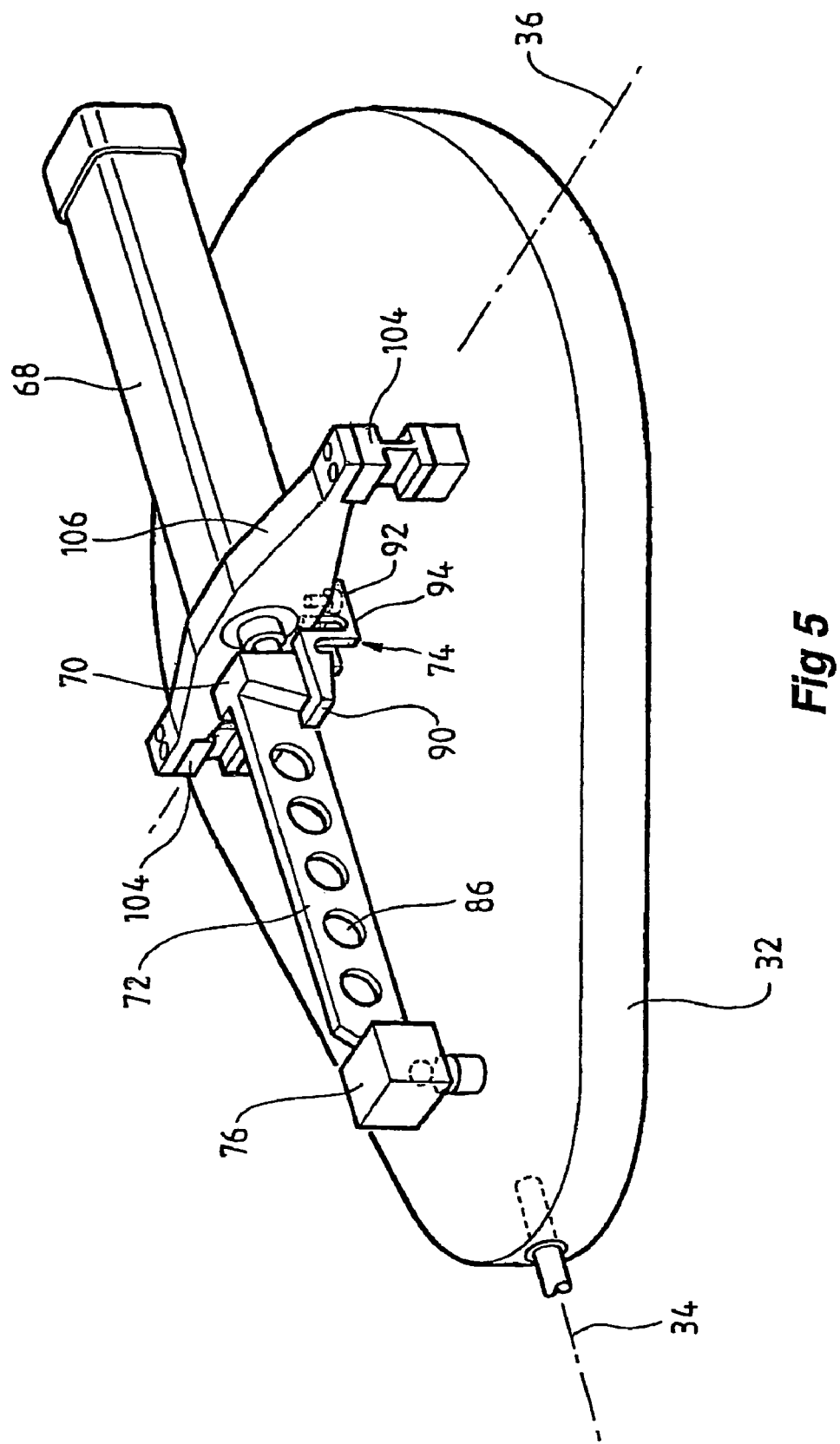
FIG. 5 is a schematic perspective view of the actuator mounted on the underside of the mirror assembly.

The scanner mirror assembly as well as the details of the actuator is illustrated in FIGS. 3–5. Thus there is shown the mirror assembly 60 including primary mirror 32 driven to oscillate around the major axis 32 by motor assembly 62 and controlled by encoder assembly 64. To maintain a low temperature, the motor is cooled by the use of cooling tubes 66 wound around the motor assembly.

The mirror 32 is oscillated around the minor axis 34 (perpendicular to the page) by the use of a piezo electric actuator 68 extending longitudinally and symmetrically across the mirror 32, the actuator 68 mechanically coupled to one end 70 of mechanical lever or arm 72 through flexible hinge 74, the other end 76 of lever, 70 engaging the mirror 32. Flexible hinge 74 provides backlash free coupling to the piezo housing 78.

The lever 72 includes at end 76 an adjusting means 80 that enables the mirror 32 to be adjusted to a relative "zero" orientation. The dimensions of the lever 72 are so chosen to amplify the movement of the piezo electric actuator some 10 times.

Biasing means such as compression spring 82 attached to the mirror 32 and the supporting frame 84 provides the restoring force for the mirror 32 to return to its zero position.

The use of the piezoelectric or other actuator is preferably located near the centre of the rotation of the mirror 32 to reduce the moment of inertia.

Part of the lever design is that it must have good mechanical damping to provide a high frequency response. The lever arm 72 is typically stainless steel, drilled with holes 86 to reduce the mass whilst still keeping it stiff. The arm is provided with rounded hardened tips to minimise wear.

The scanning mirror 32 is preferentially webbed to reduce mass whilst retaining stiffness to eliminate resonance. Use of a sensor or transducer 88 provides information on the total movement. This sensor may be either a laser light firing to spherical surface and being collected back on itself with electronic devices measuring the distance and thus the relative movement.

The piezo is the actuator in the mirror control system. The piezo transducer is only able to provide force in one direction and the returning force is provided by the spring 82.

Referring specifically to FIGS. 5 and 6 there is shown in more detail the actuator 68 and lever 72. The flexible hinge 74 is made up of two mounting pads, the first pad 90 joined to the second pad 92 through a common bridge 94 including a deep cutout 96 that enables the two pads to flex with respect to each other.

The first pad 90 is adapted to be fixedly attached to the lever 72 at end 70 using known means such as screws 98. The second pad is adapted to be attached to the actuator 68 also using well known fixing means such as screws 100 and includes a pair of wings 102 that are used to attach the actuator to the assembly frame.

To allow the mirror to pivot around the minor axis 36 the actuator is flexibly attached to the mirror 32 through two substantially identical pivot members 104 that are attached to the actuator through central bar 106 and to the mirror at fixing points 108 that are more clearly shown in FIG. 2.

In summary, to produce a rectilinear scan pattern, the scanning system of a LADS system must compensate for the forward movement of the aircraft by oscillating the scanner mirror about the minor scan axis. A minor actuator, which consists of a stack or piezo crystals coupled to a mechanical lever performs this oscillation of the scanner mirror. When a DC excitation voltage is applied to the piezo crystal elements, the stack length increases linearly with the applied voltage. This extension is then amplified by the mechanical lever to produce the required mirror movement.

Thermal drift caused by heat build up of the piezo stack is compensated by the piezo housing typically made of titanium.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

What is claimed is:

1. A mirror assembly adapted for rotation around an axis including:
    a mirror;
    a piezo electric actuator;
    a longitudinal lever flexibly attached at one end to said actuator and mechanically coupled at the other end to the mirror at a location distal to said axis of rotation; said mirror pivotably attached to said actuator along said axis of rotation wherein operation of said actuator causes it to extend, extending and rotating said lever causing said mirror to pivot around its axis of rotation from a rest position.

2. A mirror assembly as in claim 1, wherein said lever is connected to said actuator through a flexible hinge.

3. A mirror assembly as in claim 1, wherein said mirror is mounted to said actuator through a frame.

4. A mirror assembly as in claim 1, wherein said lever other end is mechanically coupled to said mirror through an adjusting means enabling the angular position of the mirror at rest to be adjusted with respect to the lever.

5. A mirror assembly as in claim 1, wherein said mirror is attached to said frame through a biasing means adapted to bias the mirror to its rest position.

6. A mirror assembly as in claim 5 wherein said biasing means is located at a position in line with the direction between the adjusting means and the axis of rotation.

7. A mirror assembly as in claim 6 wherein said biasing means is located at a distance from the axis of rotation further than the distance between the axis of rotation and the adjusting means.

8. A mirror assembly as in claim 5, wherein said biasing means is a spring.

9. A mirror assembly as in claim 1, said mirror assembly adapted to rotate in another axis of rotation.

10. An apparatus for the measurement of water depth said apparatus to be mounted on a flying platform and including: a transmitter and a receiver of laser light and having at least two wavelengths so as to receive a first reflection from the surface of a body of water and a second reflection from the bottom of said body of water;
    a mirror adapted to reflect said second reflection and rotate around a major and a minor axis, wherein the rotational motion of said mirror around said minor axis is provided by a piezo electric actuator; and wherein said piezo electric actuator drives said mirror around the minor axis through a mechanical lever.

11. An apparatus as in claim 10 wherein said mechanical lever amplifies the movement of the piezo electric actuator.

12. An apparatus as in claim 10, further including a biasing means biasing said mirror in a direction opposite the movement of the piezo electric actuator.

13. An apparatus as in claim 10, wherein said piezo electric actuator is of a longitudinal configuration and extends generally parallel to the major axis of the mirror.

14. An apparatus as in claim 10, wherein rotation of the mirror is generally orthogonal to the direction of the flying platform, said mirror thereby effectively scanning across the bottom of the body of water in a direction generally perpendicular to the direction of movement of the flying platform.

* * * * *